(No Model.)
C. HOWIND.
TOOL FOR TURNING ROUND TENONS.
No. 303,432. Patented Aug. 12, 1884.
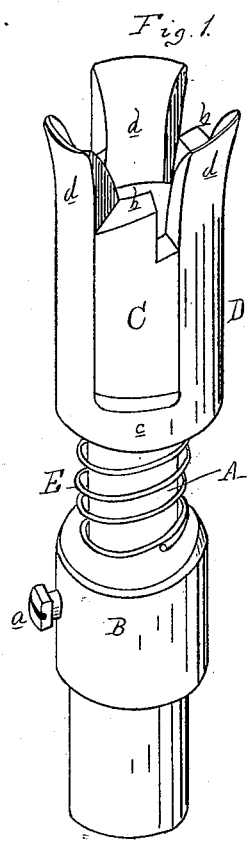
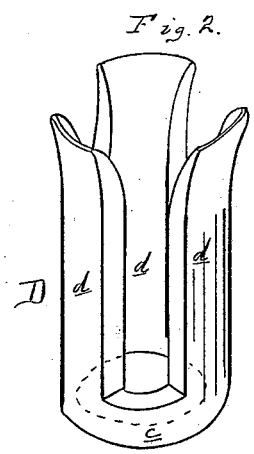
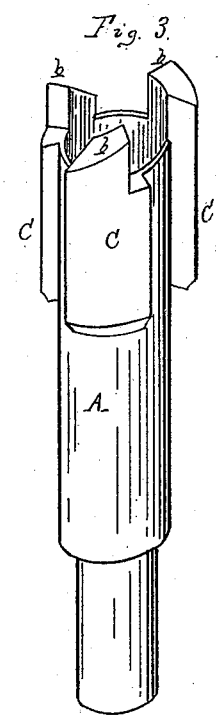
Attest:
A. S. Sprague
E. Scully
Inventor:
Charles Howind
By his Att'y
Thos. S. Sprague

UNITED STATES PATENT OFFICE.

CHARLES HOWIND, OF JACKSON, MICHIGAN.

TOOL FOR TURNING ROUND TENONS.

SPECIFICATION forming part of Letters Patent No. 303,432, dated August 12, 1884.

Application filed January 23, 1884. (No model.)

*To all whom it may concern:*

Be it known that I, CHARLES HOWIND, of Jackson, in the county of Jackson and State of Michigan, have invented new and useful Improvements in Tools for Turning Round Tenons; and I do hereby declare that the following is a full, clear, and exact description thereof, reference being had to the accompanying drawings, which form a part of this specification.

This invention relates to certain new and useful improvements in tools for turning round tenons, by means of which such tenons are readily formed with square shoulders.

The invention consists in the peculiar construction of parts and their combination, as more fully hereinafter described, for centering and turning round tenons with square shoulders on spokes, handles, and other articles requiring such tenons, while at the same time the device can be employed with a hollow mandrel for turning round handles and other similar articles.

Figure 1 is a perspective showing my improved device attached to the spindle of a lathe and ready for action. Fig. 2 is a detached perspective of the traveling guide. Fig. 3 is a like view of the cutter-spindle.

In the accompanying drawings, which form a part of this specification, A represents a hollow mandrel, hollow for a portion of its length, adapted to engage with the end of a lathe-spindle, B, and *a* is a set-screw to hold the two in such engagement, so that the mandrel can be exchanged for others of a different size. Secured to the wall of this mandrel are the cutters C, the cutting-edges *b* of which project beyond the end of the mandrel on the plane of its inner wall. D is a traveling guide, consisting of a collar, *c*, sleeved on the mandrel, and to which the projecting centering fingers *d* are secured, which travel, in their projection and retraction, between the cutters C. The projecting ends of these fingers are beveled off on their inner faces to form a flaring mouth to receive and centrally guide the blank to be operated upon. E is a spring interposed between the collar *c* and the end of the lathe-spindle, to always hold the traveling guide-fingers in projection except when the same are forcibly retracted.

In practice the end of the handle upon which the tenon is to be turned is forcibly presented to the projecting mouth formed by the fingers of the traveling guide, and the peculiar formation of this flaring mouth at once centers the handle, and then, under continued pressure, the handle causes the fingers to retract, the collar and such pressure overcoming the resistance of the spring until the end of such handle is forced against the cutters, which now, under continued pressure on the other end of the handle, cut the tenon, leaving a square shoulder, the tenon as it is cut entering the hollow mandrel, to which the cutters are attached.

What I claim as my invention is—

1. A tool for turning round tenons, consisting of a mandrel carrying the cutters, and a reciprocating centering-guide sleeved outside of said mandrel, substantially as and for the purposes described.

2. A tool for turning round tenons, consisting of a hollow mandrel, and cutters secured thereto and projecting beyond the end of said mandrel, in combination with a reciprocating centering-guide consisting of a collar with fingers secured thereto and projecting therefrom, between the knives, substantially as and for the purposes specified.

3. A tool for turning round tenons, consisting of a hollow or partially hollow mandrel, cutters secured to the same and projecting beyond the end of said mandrel, a collar sleeved on said mandrel, with projecting fingers beveled on their inner and projecting ends, and a resistance-spring on said mandrel, the parts being constructed, arranged, and operating substantially as and for the purposes set forth.

CHARLES HOWIND.

Witnesses:
H. S. SPRAGUE,
E. SCULLY.